(12) United States Patent
Schmitt

(10) Patent No.: US 6,676,130 B2
(45) Date of Patent: Jan. 13, 2004

(54) SHAFT SEALING RING

(75) Inventor: Wolfgang Schmitt, Viernheim (DE)

(73) Assignee: Dichtungstechnik G. Bruss GmbH & Co., Hamburg (DE)

(*) Notice: Subject to any disclaimer, the term of this patent is extended or adjusted under 35 U.S.C. 154(b) by 0 days.

(21) Appl. No.: 10/073,159

(22) Filed: Feb. 13, 2002

(65) Prior Publication Data

US 2002/0113374 A1 Aug. 22, 2002

(30) Foreign Application Priority Data

Feb. 19, 2001 (DE) ............................ 101 07 723

(51) Int. Cl.⁷ .............................................. F16J 15/32
(52) U.S. Cl. ...................... 277/349; 277/351; 277/353; 277/561; 277/562
(58) Field of Search ................... 277/346, 349, 277/351, 353, 549, 561, 562

(56) References Cited

U.S. PATENT DOCUMENTS 3,493,235 A * 2/1970 Pautz et al. .................. 277/433
4,194,748 A * 3/1980 Forch et al. ................. 277/573
4,265,455 A    5/1981 Lundgren
4,277,072 A    7/1981 Forch
4,484,752 A * 11/1984 Bentley ....................... 277/377

FOREIGN PATENT DOCUMENTS

| DE | 2345487 | 9/1973 |
| DE | 2339353 | 3/1975 |
| EP | 0012133 | 6/1980 |
| GB | 1441000 | 6/1976 |

* cited by examiner

Primary Examiner—Anthony Knight
Assistant Examiner—E Peavey
(74) Attorney, Agent, or Firm—Duane Morris LLP

(57) ABSTRACT

Provision is made in a shaft sealing ring, comprising a rotary support body, at least one sealing lip mounted on the support body and extending at least partly in radial direction, and a sealing surface offered by the sealing lip and contacting a stationary countersurface, for the sealing lip to consist of a material which is permeable to the medium to be sealed off and permits penetration of the medium to be sealed off from a surface of the sealing lip facing the sealed space to the sealing surface.

25 Claims, 3 Drawing Sheets

SHAFT SEALING RING

The invention relates to a shaft sealing ring of the kind defined in the preamble of claim 1.

In such a shaft sealing ring, known from DE 23 39 353 C3, the sealing lip is made of a material which is permeable to the medium to be sealed off, for example a fleece or nonwoven. A coating is applied to the surface of the sealing lip facing the sealed space so as to prevent leakage across the sealing lip.

The limits of operating parameters of a machine unit, such as gearing, converters, and the like often are set in consideration of shaft sealing rings. It is the chemical and thermal resistancey of the material of the sealing lip facing the medium to be sealed off which determines such limits. And it must be taken into account that, in the area of contact with the seal, the temperature of the medium to be sealed off rises still further due to frictional heat.

For example, according to German industrial standard DIN 3761 a mean temperature of 130° C. in the oil sump should not be exceeded when sealing off hypoid oils by means of shaft sealing rings having sealing lips which are made of fluoroplastics (FPM) and are adapted to withstand maximum loading. In the case of sealing off ATF oil, however, the admissible mean temperature is 150° C. Moreover, a rotational speed of 9000 r.p.m. should not be surpassed with typical shaft diameters for the use of radial shaft sealing rings in automatic transmissions. This corresponds to a circumferential speed of clearly less than 30 m/sec.

It is an object of the invention to devise a shaft sealing ring which provides reliable sealing and sufficiently long service life even when the temperatures and circumferential speeds mentioned above are exceeded.

This object is met by claim 1.

When using the shaft sealing ring in an automatic power transmission, for instance, the free surface of the sealing lip of the shaft sealing ring facing the sealed space is exposed to the medium to be sealed off. Medium to be sealed off penetrates the material of the sealing lip, as this is permeable to the medium to be sealed off, and thus reaches the sealing surface. The medium to be sealed off is conveyed along the sealing surface to be returned into the sealed space by the centrifugal forces acting by virtue of the rotation of the support body with the sealing member. In this manner the medium to be sealed off which is located in the contact zone of the sealing ring undergoes quick exchange and, therefore, heat dissipation is rapid.

The return flow of medium to be sealed off, as generated by the centrifugal force and caused by the permeability of the material of the sealing lip, making its way from the sealed space through the sealing lip to the sealing surface and back into the sealed space, assures continuous lubrication of the sealing surface with fresh medium to be sealed off. Hereby, friction is reduced at the sealing surface and the countersurface and, as a consequence, the frictional heat and the resulting rise in temperature of the medium to be sealed off are curbed.

As a result of the quick exchange, the medium to be sealed off is exposed for much shorter periods to the higher temperatures at the sealing surface and countersurface. The frictional heat generated at the sealing surface is dissipated continuously from the sealing surface zone by the quick exchange of the medium to be sealed off.

A shaft sealing ring according to the invention may be used also at high operating temperatures and elevated circumferential speeds without costly structural modifications. Satisfactory longevity of the shaft sealing ring can be warranted for rotational speeds as high as in the order of 12000 r.p.m. and for shaft diameters in the range of 60 mm.

A preferred material for the sealing lip is a nonwoven material which is compatible with the medium to be sealed off. Suitable materials are mechanically bonded nonwovens, preferably needled nonwovens. A mechanically bonded nonwoven containing polyester fibers is preferred. Nonwovens bonded by elastomers, especially by latex are suitable as well.

An essential difference of the shaft sealing ring according to the invention as against the one disclosed in DE 23 39 353 C3 resides in the fact that the sealing lip is not protected by a coating or cover impermeable to the medium to be sealed off. In spite of the fact that, in principle, medium to be sealed off thus may get by the sealing lip from the sealed side to the air side of the seal, leakage in operation nevertheless is prevented by the effect of the centrifugal force which diverts the flow of medium to be sealed off in radial outward direction.

Advantageous modifications of the invention are indicated in the dependent claims.

The invention will be described further, by way of example, with reference to the accompanying drawings, in which.

Throughout the drawings, like members or members having the same function are designated by like reference numerals and will not be described repeatedly.

Figure 1:
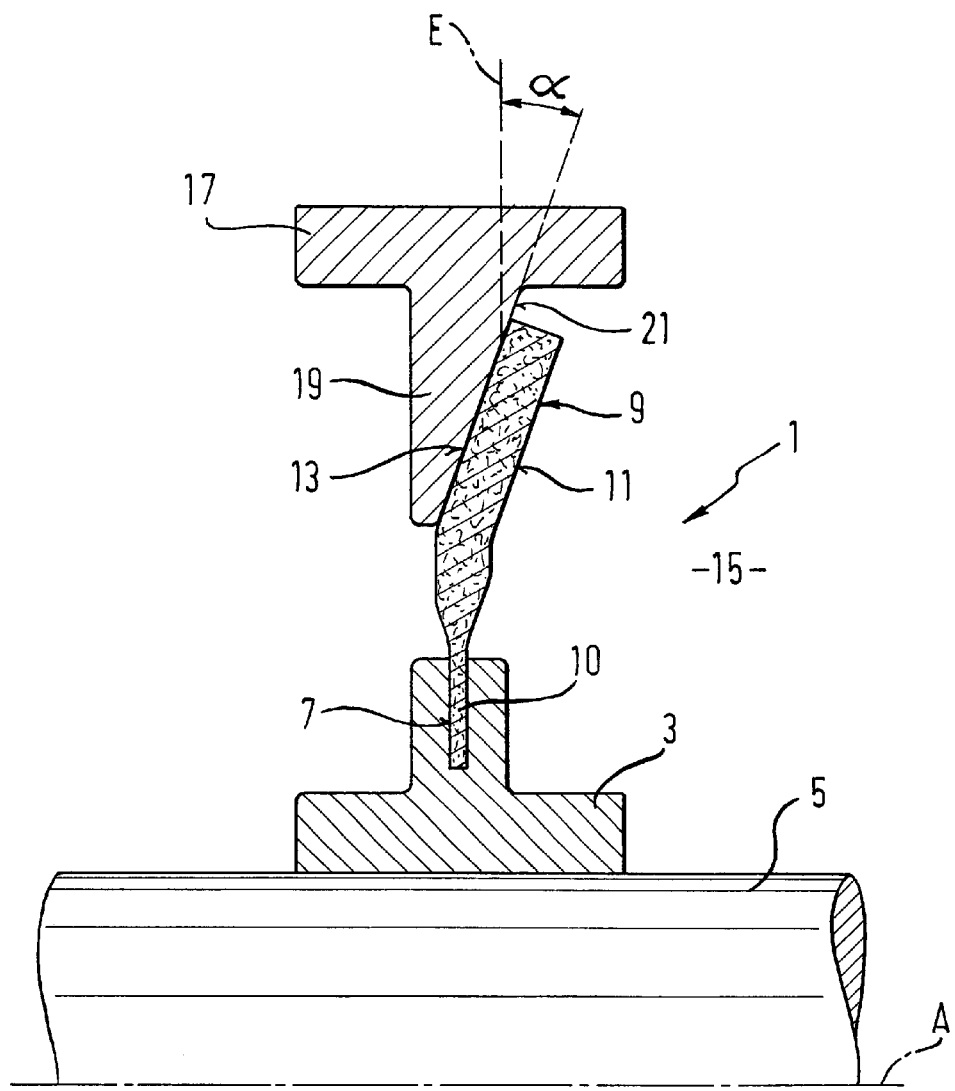
FIG. 1 shows a first embodiment of a shaft sealing ring according to the invention.

The shaft sealing ring 1 shown in FIG. 1 has an annular support body 3 which is T-shaped in cross section. The support body 3 is pressed onto a shaft 5.

A radially outwardly directed leg of the support body 3 is formed with a continuous slit 7. A sealing lip 9 of annular disc shape is firmly seated in the slit 7 or molded into it by a narrow securing portion 10. In unassembled state, the sealing lip 9 projects outwardly in radial direction from the securing portion 10.

The body of the sealing lip 9 has two opposed surfaces 11, 13 of which a free surface 11 faces the sealed space 15, while a sealing surface 13 is remote from the sealed space 15.

Opposite the support body 3, an annular counterpart 17 likewise of T-shaped cross section is fixed to a casing. The counterpart 17 either is firmly secured to or formed integral with a gear casing (not shown). The counterpart preferably is made of a material which is a good thermal conductor, such as steel, whereby the frictional heat generated at its countersurface can be dissipated from the countersurface into the casing.

A leg 19 of the counterpart 17 extending radially inwardly has a countersurface 21 which faces the sealed space 15 and is inclined towards the shaft 5 at an angle alpha with respect to a vertical plane E. Once mounted, the leg 19 holds the elastic sealing lip 9 bent at angle $\alpha$ from the radial direction. That provides contact pressure between the sealing lip 9 and the leg 19 as determined by the resiliency of the sealing lip 9.

The sealing lip 9 is made of a fibrous fleece or nonwoven material adapted to receive and pass the medium to be sealed off. In operation, medium to be sealed off in the sealed space 15 splashes against the free surface 11 of the sealing lip 9 and penetrates the nonwoven material. The centrifugal forces generated by rotation of the shaft 5 with the support body 3 and sealing lip 9 and acting on the medium to be sealed off convey medium which has entered into the sealing lip 9 outwardly in radial direction through the sealing lip 9 to the plane of separation between the sealing surface 13 and the countersurface 21. Under the action of the centrifugal force the medium to be sealed off is conveyed back into the sealed space 15 along the inclined countersurface 21.

Figure 2:
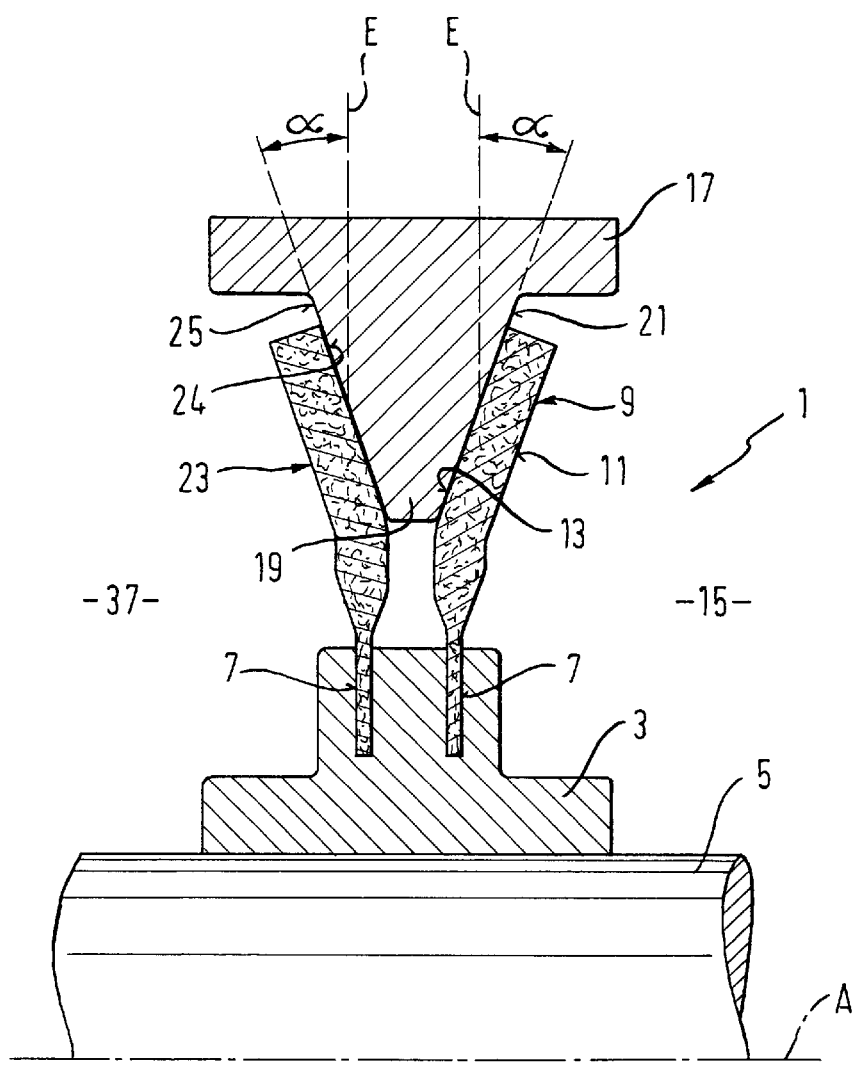
FIG. 2 shows a second embodiment of a shaft sealing ring according to the invention.

In addition to the sealing lip 9 which prevents leakage of medium to be sealed from the sealed space 15, the shaft sealing ring 1 shown in FIG. 2 comprises another sealing lip 23 to prevent leakage of medium to be sealed off from a sealed space 37. The sealing lip 23 which is arranged in inverse relationship to the sealing lip 9 likewise is fixed in the radially outwardly oriented leg of the T-shaped support body 3. It has a sealing surface 24 engaged with a countersurface 25 of the counterpart 17 facing the sealed space 37. This countersurface 25 is disposed in inverse relationship to the countersurface 21 at the other side of the leg 19 of the counterpart 17, i.e. at an inclination angle α in opposite direction.

The sealing lip 23 likewise is made of a fibrous fleece or nonwoven material so that again a flow of medium to be sealed off is established by centrifugal force from the sealed space 37 to the sealing surface 24 and back into the sealed space 37.

The embodiment shown in FIG. 2 of the shaft sealing ring seals two spaces 15, 37 containing two media to be sealed off. Thus, the shaft scaling ring 1 of FIG. 2 prevents any exchange of media to be sealed off in the respective spaces 15, 37. The otherwise customary drain bores between the two sealing lips, involving great structural expenditure, may be dispensed with.

In both embodiments, according to FIGS. 1 and 2, the angle of inclination α advantageously lies between 10° and 60°, and preferably is 20°.

Figure 3:
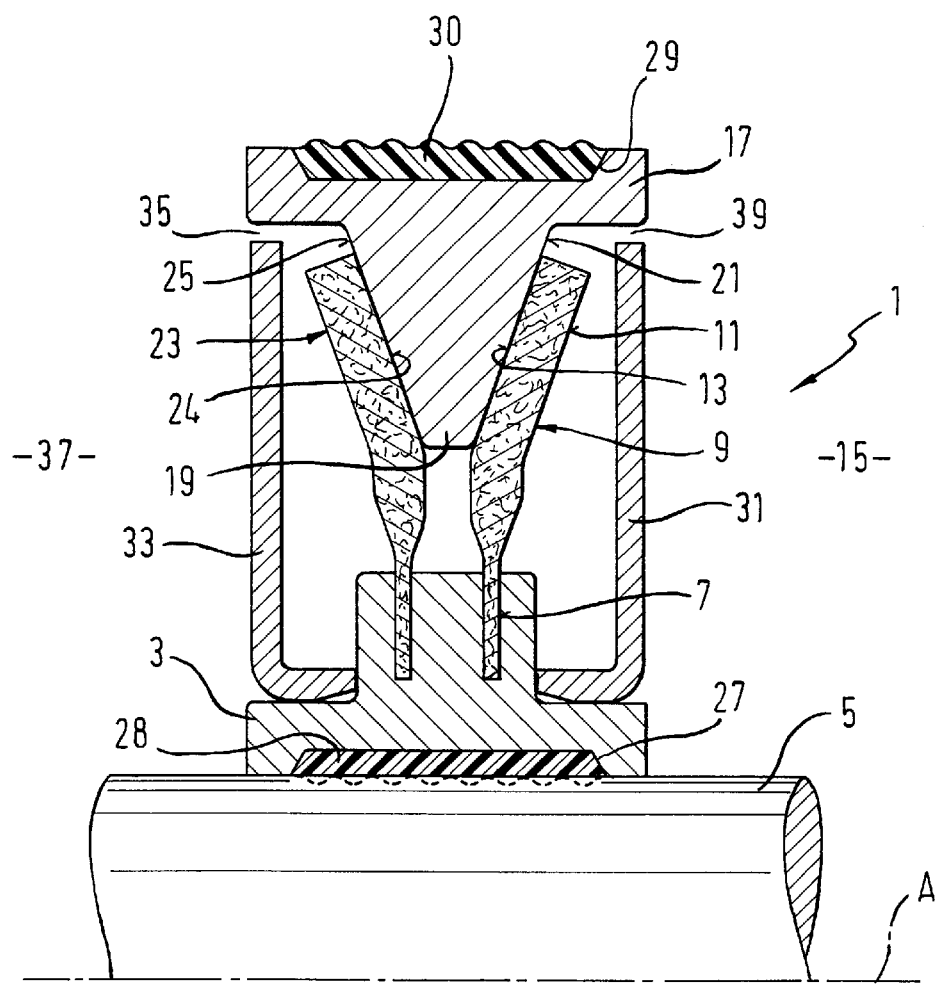
FIG. 3 shows a modification of the embodiment shown in FIG. 2.

Simple assembly and safe storage as well as transportation are guaranteed with the shaft sealing ring 1 shown in FIG. 3 in the form of a one-piece component which fundamentally has the same structure as the one illustrated in FIG. 2. It comprises not only the support body 3 and sealing lips 9 and 23 but also the counterpart 17 to be firmly secured to the casing. An annular groove 27 is formed in the support body 3 to fix it for rotation with the shaft 5. An annular groove 29 is formed also in the counterpart 17. Both annular grooves 27, 29 are filled with rubber rings 28, 30 which have corrugated outer surfaces the peaks of which are depressed upon assembly so as to provide a firm fit.

Cover discs 31, 33 are mounted laterally on the support body 3 to make sure that the sealing lips 9 and 23 made of fibrous fleece do not become damaged during transportation and installation and to guarantee a sealing effect also in the non-operative condition of the shaft seal. An annular gap 35, 39 between the cover discs 31, 33 and the counterpart 17 allows limited influx of medium to be sealed off to the sealing lips 9, 23.

The features disclosed in the specification above, in the claims and drawings may be essential to implementing the invention in its various embodiments, both individually and in any desired combination.

What is claimed is:

1. A shaft sealing ring, comprising a rotary support body, at least one sealing lip mounted on the support body and extending at least partly in radial outward direction from the support body forming a free end, wherein the sealing lip is flexurally supported by the support body, and a sealing surface offered by the free end of the sealing lip and contacting a stationary countersurface, wherein the countersurface and the sealing surface are inclined with respect to a plane normal to the longitudinal shaft axis, wherein the sealing lip is made of a fleece material which is permeable to the medium to be sealed off and permits passage of the medium to be sealed off from the sealed space to the sealing surface, wherein the fleece material is a non-woven elastomer which is compatible with the medium to be sealed off.

2. The shaft sealing ring as claimed in claim 1, wherein the support body is connected to the shaft.

3. The shaft sealing ring as claimed in claim 1, wherein the non-woven elastomer of the sealing lip is bonded by a latex material.

4. The shaft sealing ring as claimed in claim 3, wherein the fleece material is a mechanically bonded nonwoven material.

5. The shaft sealing ring as claimed in claim 4, wherein the nonwoven contains polyester fibers.

6. A shaft sealing ring, comprising a rotary support body, two sealing lips mounted the support body and extending at least partly in radial outward direction from the support body forming free ends, and sealing surfaces offered by the free ends of the sealing lips engage a respective one of two stationary counter surfaces offered by the support body so as to accomplish sealing towards both sides; wherein the sealing lips are made of a fleece material which is permeable to the medium to be sealed off and permits passage of the medium to be sealed off from the sealed space to the sealing surfaces.

7. The shaft sealing ring as claimed in claim 6, wherein the two sealing lips and the countersurfaces are arranged in mutually inverse relationship.

8. The shaft sealing ring as claimed in claim 1, wherein the countersurface or each countersurface is inclined with respect to a plane normal to the longitudinal shaft axis.

9. The shaft sealing ring as claimed in claim 8, wherein the angle of inclination alpha between the vertical plane and the or each countersurface lies between 10° and 60°.

10. The shaft sealing ring as claimed in claim 1, comprising a counterpart fixed to a casing and provided with the countersurface or countersurfaces.

11. The shaft sealing ring as claimed in claim 10, wherein the counterpart is made of a material which is a good heat conductor.

12. The shaft sealing ring as claimed in claim 1, wherein a cover disc is mounted on the support body at the side of the sealed space.

13. The shaft sealing ring as claimed in claim 12, wherein a gap is provided between the cover disc and the counterpart which is fixed to the casing.

14. The shaft sealing ring as claimed in claim 6, wherein the support body is connected to the shaft and the sealing lips are flexurally supported by the support body.

15. The shaft sealing ring as claimed in claim 6, wherein the fleece material is a non-woven elastomer which is compatible with the medium to be sealed off.

16. The shaft sealing ring as claimed in claim 6, wherein the fleece material is a mechanically bonded nonwoven material.

17. The shaft sealing ring as claimed in claim 16, wherein the fleece material is a needled nonwoven material.

18. The shaft sealing ring as claimed in claim 16, wherein the nonwoven elastomer is bonded by a latex material.

19. The shaft sealing ring as claimed in claim 6, wherein each countersurface is inclined with respect to a plane normal to the longitudinal shaft axis.

20. The shaft sealing ring as claimed in claim 19, wherein the angle of inclination alpha between the vertical plane and each countersurface lies between 10° and 60°.

21. The shaft sealing rings as claimed in claim 20, wherein the angle of inclination alpha is approximately 20°.

22. The shaft sealing ring as claimed in claim 6, comprising a counterpart fixed to a casing and provided with countersurfaces.

23. The shaft sealing rings as claimed in claim 22, wherein the counterpart is made of a material which is a good heat conductor.

24. The shaft sealing ring as claimed in claim 6, wherein a cover disc is mounted on the support body at the side of the sealed space.

25. The shaft sealing ring as claimed in claim 24, wherein a gap is provided between the cover disc and the counterpart which is fixed to the casing.

* * * * *